United States Patent [19]

Smith et al.

[11] 3,735,026

[45] May 22, 1973

[54] AUTOMATIC COLOR CORRECTOR FOR A COLOR VIDEO SIGNAL

[75] Inventors: Clyde W. Smith, North Salem, N.Y.; Renville H. McMann, New Canaan, Conn.

[73] Assignee: Columbia Broadcasting System, Inc., New York, N.Y.

[22] Filed: Sept. 3, 1971

[21] Appl. No.: 177,567

[52] U.S. Cl. ....................................178/5.4 R
[51] Int. Cl. ....................................H04n 9/00
[58] Field of Search ....................178/5.2 R, 5.2 A, 178/5.4 AC, 5.4 HE, 5.4 R

[56] References Cited

UNITED STATES PATENTS

| | | | |
|---|---|---|---|
| 2,888,514 | 5/1959 | Pritchard | 178/5.4 R |
| 3,107,275 | 10/1963 | Chatten | 178/5.4 AC |
| 3,255,305 | 6/1966 | Chatten | 178/5.2 R |
| 3,283,067 | 11/1966 | Bazin et al. | 178/5.4 R |
| 3,604,844 | 9/1971 | Ross | 178/5.4 AC |

*Primary Examiner*—Robert L. Griffin
*Assistant Examiner*—George G. Stellar
*Attorney*—Spencer E. Olson

[57] ABSTRACT

A video signal color corrector automatically operative to restore standard color balance in a color video signal. Video signal color content is detected in substantially black and substantially white portions of the video signal where there should be little or no color. This color content during white and black portions is then used to generate error signals which have proportional and constant components respectively. The error signal is combined with the video signal to cancel erroneous color information and restore the standard color balance.

15 Claims, 3 Drawing Figures

AUTOMATIC COLOR CORRECTOR FOR A COLOR VIDEO SIGNAL

FIELD OF THE INVENTION

This invention relates to television signal processing and in particular to automatic color standardization of color video signals.

BACKGROUND OF THE INVENTION

In the transmission of color television program information, transmitted signals may be derived from both live and taped video sources, which themselves may be derived from various and diverse sources. Even with careful adjustment of color balance from these sources they are likely to drift or be calibrated to different standards. Subsequent signal processing may also add variations to the color balance of the original signal. Moreover, it is not always possible to provide a high degree of color correction in the source material where, for example, fast-breaking news events necessitate on-the-spot filming and rapid network distribution of the recorded material. The ultimate picture transmitted to the home receiver thus produces scene-to-scene color variations in areas which should be of the same color.

While as indicated above, it is possible to make adjustments at one or more stages in the processing of a color video signal, such adjustments are often awkward if not difficult to make. For example, in the case of a color television film produced and distributed in an acetate form for independent transmission at numerous stations, such a film typically includes a number of so called "dubs" from a variety of sources. It is very difficult to separately color balance all sections of the film to a single color standard before distribution and then, at the individual station, make a further adjustment for the differences between the color balances of that film relative to other station programming.

Until recently even the ability to make color balance or other color correction in a video signal at any particular point in the video signal processing was severely limited. Recent developments have made available a manual color correction system for use at any point in the video signal processing. This earlier development, filed as United States Patent application, Ser. No. 820,790 on May 1, 1969, now U.S. Pat. No. 3,604,844, was a significant step forward in the provision of a consistently balanced image on the receiver screen of the ultimate home viewer.

SUMMARY OF THE INVENTION

The present invention is an improvement of the earlier concept described in the above application and provides a system for achieving video signal color correction which is automatically operative at a sufficient rate to prevent perception of color variation.

In one embodiment of the invention, the described circuitry functions to sample a color video signal which includes the luminance signal and subcarrier modulated chrominance signals. In particular, chrominance and luminance signals are separately decoded or demodulated to provide luminance signals representative of ultimate screen brightness. The chrominance information signals are demodulated to yield color difference signals representing a difference between red and blue primary color and luminance values. The color difference signals are sampled and stored at times of peak, white, luminance signal level and minimum, black, luminance signal level. The demodulated color difference signals are then amplified with a gain determined by the levels of the stored color difference signals for white signal levels while the stored color difference signals from black representing low luminance values are used to provide an offset value to the demodulated and amplified signals. The amplified and offset color difference signals are then encoded or modulated to provide an error signal which is combined substractively with the original video signal to produce a color corrected video signal.

The offset correction developed from black, minimum, luminance signals provides a constant color shift which insures that the corrected video will have no color signal at minimum black levels.

The effect of the correction developed from color difference signals at peak, white, luminance levels, is to proportionately alter the balance between the colors in the video to provide, over the range of variation in screen luminance or brightness, proper color balance.

In a further embodiment, the circuitry of the invention is applied to a color signal source such as a live color camera to sample color content during high and low luminance conditions and to automatically correct color errors thereby detected.

DESCRIPTION OF THE DRAWINGS

These and other aspects of the present invention will be more fully developed below in a detailed description of the preferred embodiment, presented for purposes of illustration, and not by way of limitation, and in the accompanying drawings, of which.

DETAILED DESCRIPTION OF THE PREFERRED EMBODIMENT

Figure 1:
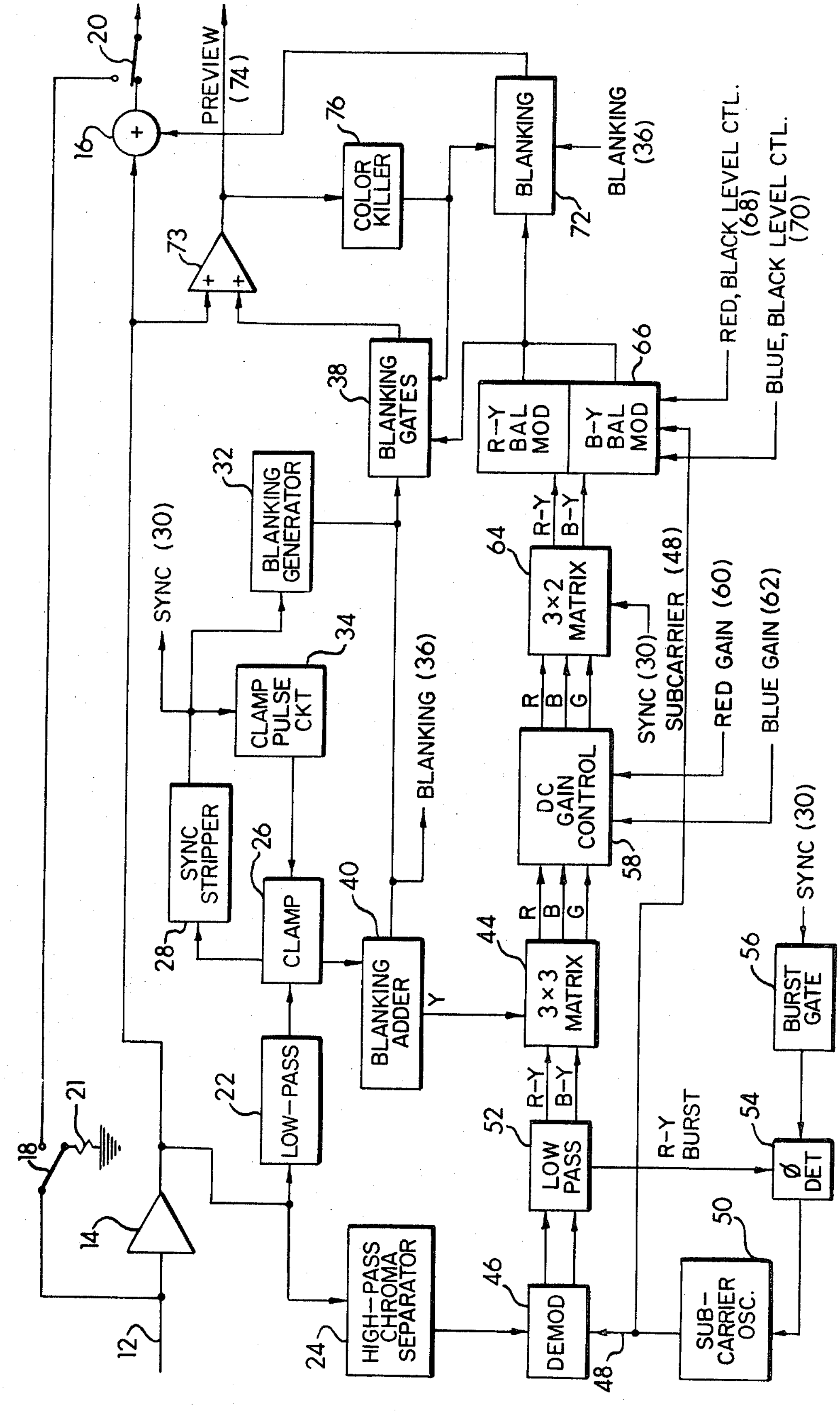
FIG. 1 is a block and partial schematic diagram of the electronics for generating the luminance and chrominance signals from a composite video signal and for adjusting those signals in response to control signals.

In the typical color television receiver, the display screen is illuminated with not only a varying brightness or luminance pattern but also a color modulation of that brightness with the prescribed combination of the three primary colors, red, green and blue. In accomplishing this, the typical picture tube for forming a color television image comprises three adjacent electron guns, one for each of the three primary colors, placed to direct electron beams onto a target containing a plurality of patterns of three adjacent phosphor dots providing respectively red, green and blue light emissions. In order to guide the beams from each color representing electron gun to the appropriate dot and only that dot, a mask with a plurality of holes is provided a predetermined distance behind the target screen.

The transmitted color television video signal is capable of demodulation to properly illuminate such a color picture tube and at the same time compatible with existing signal demodulation of black and white television receivers to provide a corresponding black and white image. In the signal format for achieving this, the brightness or luminance signal is generated and transmitted substantially the same as with an all black and white system. The intensity information for the three primary colors are, however, encoded as two separate signals, it being known that substantially all visible colors are expressible in terms of two color representing quantities. A linear transformation on the three primary color intensity signals produces two color difference signals, a first indicating whether the color is in the red-orange or the green-blue range and at what intensity and a second indicating whether the color is in the green-yellow or magenta range and at what intensity. Thus any particular color can be represented by an appropriate combination of these two color difference signals. The absence of the color intensity information indicates a signal somewhere on the black-to-white grey scale as determined solely by the luminance signal. This system insures that a black and white broadcast can be displayed as such on a color receiver and that a color broadcast can be displayed in proper black and white on a black and white receiver.

While the color and brightness information signals can be made to vary linearly with the degree of color and brightness in the scene from which they are generated, further signal processing is employed to introduce a predetermined amount of distortion in these signals which compensates for the nonlinearity in the response of the electron gun on the receiving tube. This so called "gamma" correction is standard in all television systems and the degree of nonlinearity in the electron gun and resulting gamma correcting distortion introduced in the signal are normally defined by industry standards.

In the automatic color correcting system of the present invention a video signal is sampled and detected to indicate conditions of substantially black and substantially white luminance or brightness signal levels. The color difference signals at these levels are then used to provide an error signal which is recombined with the video to substantially null out color indications at black and white luminance conditions. While a gamma correction can be made it has been found that highly satisfactory results can be achieved without the provision for automatic gamma correction.

Referring now to FIG. 1 there is shown in block and partial schematic diagram the circuitry for sampling the composite video from any of a plurality of different sources and for developing error correcting signals therefrom in response to control signals produced by the later described circuitry in FIG. 2.

In FIG. 1, composite color video is supplied over a line 12 to a buffer amplifier 14 whose output is fed directly into a video summing circuit 16 from which the system output is taken. A bypass circuit is provided around the amplifier 14 and summer 16 through switches 18 and 20. Switch 18, in position for operation of the color corrector, loads the input to the amplifier 14 through a terminating resistor 21, while the switch 20, under the same conditions, conducts the output of summer 16 to further color video processing electronics. In the alternate positions switches 18 and 20 bypass the composite video from line 12 directly to the further processing electronics.

The output of the amplifier 14 is sampled and applied to a low-pass filter 22 to separate luminance information from the composite video and also applied to a high-pass filter 24 to separate the chrominance information from the composite video signal.

The components of the sampled composite video signal, according to standard NTSC format, include a broad-banded luminance signal of slightly more than 4 megacycles bandwidth. Combined with this are first and second color difference signals with one half and one megacycle bandwidths respectively, which are modulated onto a 3.58 megacycle subcarrier. Consequently low-pass filtering of the composite video signal by filter 22 eliminates substantially all of the chrominance information while preserving most of the luminance information. The highpass filter 24 filters out the lower frequency portions of the composite video where there is no chrominance information to preserve the modulated chrominance information with a portion of the luminance information.

In addition to the luminance and chrominance information signals in the composite video, additional synchronizing signals are periodically inserted into the video to indicate the intervals between video frames and between video scan of each line. A further component of the synchronizing signals is a burst signal of unmodulated subcarrier at 3.58 megacycles to provide a reference for the synchronous demodulation of the chrominance information.

The output of the low-pass filter 22, including the luminance and synchronous information signals, is applied to a clamp circuit 26 which functions to restore to the luminance signal a DC level which was lost in previous AC coupling. The output of the low-pass filter 22 is also supplied through the clamp circuit 26 to a sync stripper circuit 28 which extracts the synchronizing and burst signals and supplies a synchronizing signal output on a line 30 to a blanking generator 32 and a clamp pulse circuit 34. The clamp pulse circuit 34 generates a pulse in synchronism with the interval following the synchronizing interval and before program video by delaying and reshaping the synchronizing signal. This signal is used to supply the clamp circuit 26 with a signal which clamps the luminance signal to ground in this interval, thereby restoring the DC level of luminance. The blanking generator 32 responds to the synchronizing output 30 to develop a blanking signal output on a line 36 which is conducted to blanking gates 38 and a blanking adder 40. The blanking adder 40 also receives the DC restored luminance signal from the clamp circuit 26 and in response to blanking information on the line 36 provides a luminance signal output Y which is free of all synchronizing information.

Returning now to the high-pass filter 24, the chrominance and partial luminance information is applied to a synchronous demodulator circuit 46 which receives a 3.58 megacycle subcarrier reference on a line 48 from a subcarrier oscillator 50. The synchronously demodulated chrominance and partial luminance signal is applied to a low-pass network 52 which provides the color difference signals as outputs. These outputs, representing the red value minus the luminance value (R-Y) and the blue value minus the luminance value (B-Y), are conducted to the matrix 44.

The subcarrier oscillator 50 which provides the demodulation reference for the demodulator 46 is controlled in phase and frequency by phase information from a phase detector 54 which in turn receives the R-Y signal from the low-pass filter 52 and a pulse coincident with a video signal burst between the synchronizing and program video from a burst gate 56 which provides this signal in response to the synchronizing output on line 30. The phase and frequency control of the subcarrier signal on line 48 is thereby established through well known phase lock techniques to separate the two color difference information signals in the demodulator 46.

The two color difference signals were originally double side band, suppressed carrier, modulated with a 90° phase difference between them. They are separately recovered in the synchronous demodulator 46 by separate synchronous demodulation paths for which each reference is 90° separated and adjusted to be in phase with the particular color difference signal being demodulated.

The R-Y and B-Y signals from the low-pass filter 52, and the Y signal from the blanking adder 40 are linearly combined in matrix 44 to produce three output signals designated as R, B, and G which respectively represent the intensity of the red, blue and green primary color components, the green component being developed from the red and blue components which, in conjunction with the luminance component, are sufficient to uniquely define the characteristics of each color point on the receiver screen.

The three outputs of the matrix 44 are applied to a DC gain control circuit 58 which preferably comprises a red and blue multiplier the gain of which is controlled by respective red and blue, white level gain adjustment signals on lines 60 and 62. The compensated red, blue and green signals from the controller 58 are applied to a 3 × 2 transformation matrix 64 along with the sync signal output 30. The matrix 64 provides gain adjusted, clamped R-Y and B-Y signals to a dual, balanced modulator 66 which receives the subcarrier signal on line 48 for modulation by the R-Y and B-Y signals. The dual balance modulator 66 also receives respective red and blue black level control signals on lines 68 and 70 which provide a constant offset to the R-Y and B-Y information in the modulated outputs by, for example, unbalancing the modulators. The two modulated outputs of the modulator 66 are combined and applied to a blanking circuit 72 from which an error correction output signal is applied to the summer 16. The blanking circuit 72 functions in response to the blanking signal on line 36 to eliminate any error correction signal during the periods of synchronizing signals in the composite video signal.

Additionally in FIG. 1, there is included a preview video sampling circuit 73 which samples the output of the amplifier 14 and provides a preview video output on a line 74. This preview video output is applied to a color killer circuit 76 which functions conventionally to provide an indication of a black and white rather than color video signal by sensing the presence of the burst signal in color broadcast, and inhibiting any output from the blanking gates 38 and blanking circuit 72 when the burst signal is not detected as in black and white broadcast. The sampling amplifier 73 receives the error correction signal from the blanking gates 38 and in turn the modulators 66. The blanking gates 38 conduct to the sampling amplifier 73 substantially the same error correction signal, appropriately blanked, that is applied to the summing amplifier 16 to provide on the preview video line 74 duplication of the corrected video output.

Figure 2:
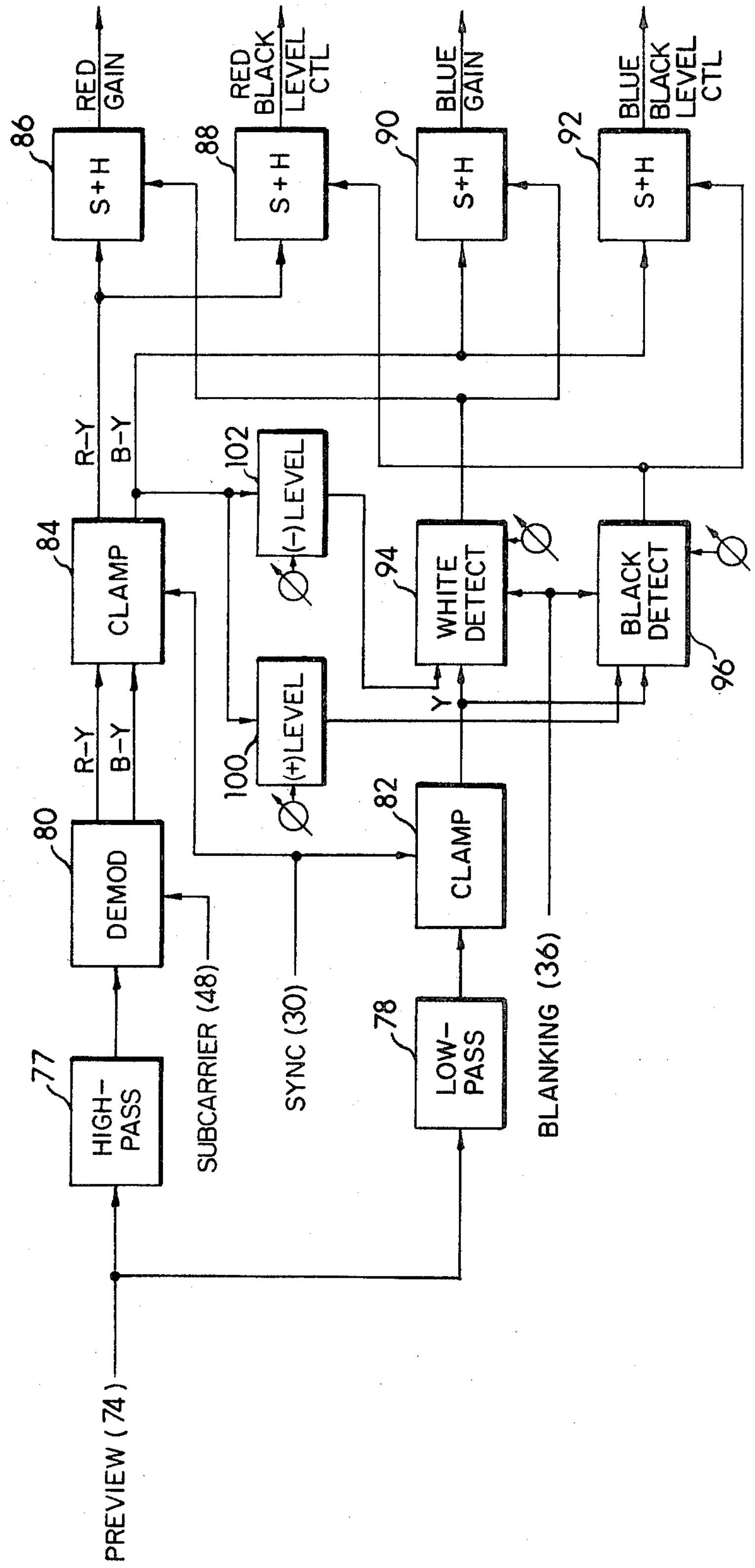
FIG. 2 is a block diagram of electronics for sampling the luminance and chrominance signals to provide the control signals for the circuitry of FIG. 1.

Referring now to FIG. 2 the preview video signal on line 74 is applied to a high-pass filter 77 and a low-pass filter 78 which respectively separate the chrominance information and the luminance information. The output of the high-pass filter 77 is applied to a demodulator 80 along with the subcarrier signal on line 48. The output of the low-pass filter 78 is applied to a clamping circuit 82 along with the sync signal output on line 30. The clamp 82 operates as above to restore the DC level to the luminance signal by referring it to ground in the interval between the synchronizing signal and program video. The outputs of the demodulator 80 are on two lines representing respectively the R-Y and B-Y color difference signals and are applied to a further clamp 84 which in conjunction with the sync signal on line 30 restores the DC level in the color difference signals.

The R-Y analog output of the clamp 84 is applied to sampling inputs of sample and hold circuits 86 and 88. The B-Y analog output of the clamp 84 is applied to sampling inputs of sample and hold circuits 90 and 92. The sample and hold circuits 86 and 90 are controlled and caused to sample their respective inputs in response to detection of white level signals from a white level detector circuit 94, which receives the luminance signal from the clamp circuit 82. Similarly, the sample and hold circuits 88 and 92 are caused to sample and hold their input signals in response to detection of black level signals from a black level detector circuit 96, which also receives the luminance signal from the clamp circuit 82. The white and black level detector circuits 94 and 96 also receive the blanking signal on line 36 to inhibit response by the detectors during the synchronizing intervals. The white and black level detectors 94 and 96 respond to the luminance signal input to provide an indication of when the luminance signal is respectively at substantially maximum and substantially minimum brightness levels. The actual thresholds for the white and black level detection can be adjusted but are preferably within approximately ten percent or less of the maximum and minimum brightness values.

Adjustable, plus and minus level detector circuits 100 and 102 receive the B-Y color difference signal as inputs and provide detection inhibit signals to the black and white level detector circuits 96 and 94 when the B-Y signal is at a high level and at a low level respectively. At a positive level the B-Y signal indicates yellow color along the blue to yellow axis represented by that signal. Because yellow is electrically indistinguishable from white, white level detector 94 is inhibited by the minus level detector 102 from operating during yellow conditions to prevent erroneous cancellation of yellow colors. Also, blue is electrically indistinguishable from black so that plus level detector 100 senses blue level conditions in the B-Y signal and inhibits the black level detector 96 from responding to black indications under conditions of substantial blue.

The signals stored in the sample and hold circuits 86 through 92 being derived from the corrected preview video signal on line 74, and being further representative of the R-Y and B-Y levels, represent color error in the corrected signal. The sample and hold circuits 86 and 90 indicate respective red and blue color gain error and the signals in the sample and hold circuits 88 and 92 indicate respective red and blue, black, or minimum, brightness level error signals. The gain error signals from the sample and hold circuits 86 and 90 are applied as respective control signals 60 and 62 to the DC gain controller 58 in FIG. 1. They operate as proportional gain control signals which, when appropriately amplified, are used to control the gain of the multipliers for the red and blue signals.

The signals sampled and held by the circuits 88 and 92 are applied as the red and blue control signals 68 and 70 to the dual balanced modulator 66. They are also error signals which are used as proportional control signals after suitable amplification to contribute a constant offset to the color difference information in the modulated signals produced from the circuits 66.

The color standards for the automatic color correcting system are established by the color difference signals which exist under conditions of maximum and minimum luminance signals. Under these maximum and minimum, or white and black, luminance signal conditions the color difference signals should indicate no color component. By detecting, sampling and holding the color information which is present at the white and black levels, error signals are derived which are used to generate a color correction signal containing a gain correction signal and a constant offset correction signal that, when recombined with the composite video signal in appropriate polarity, are operative to cancel the color errors in that signal.

Figure 3:
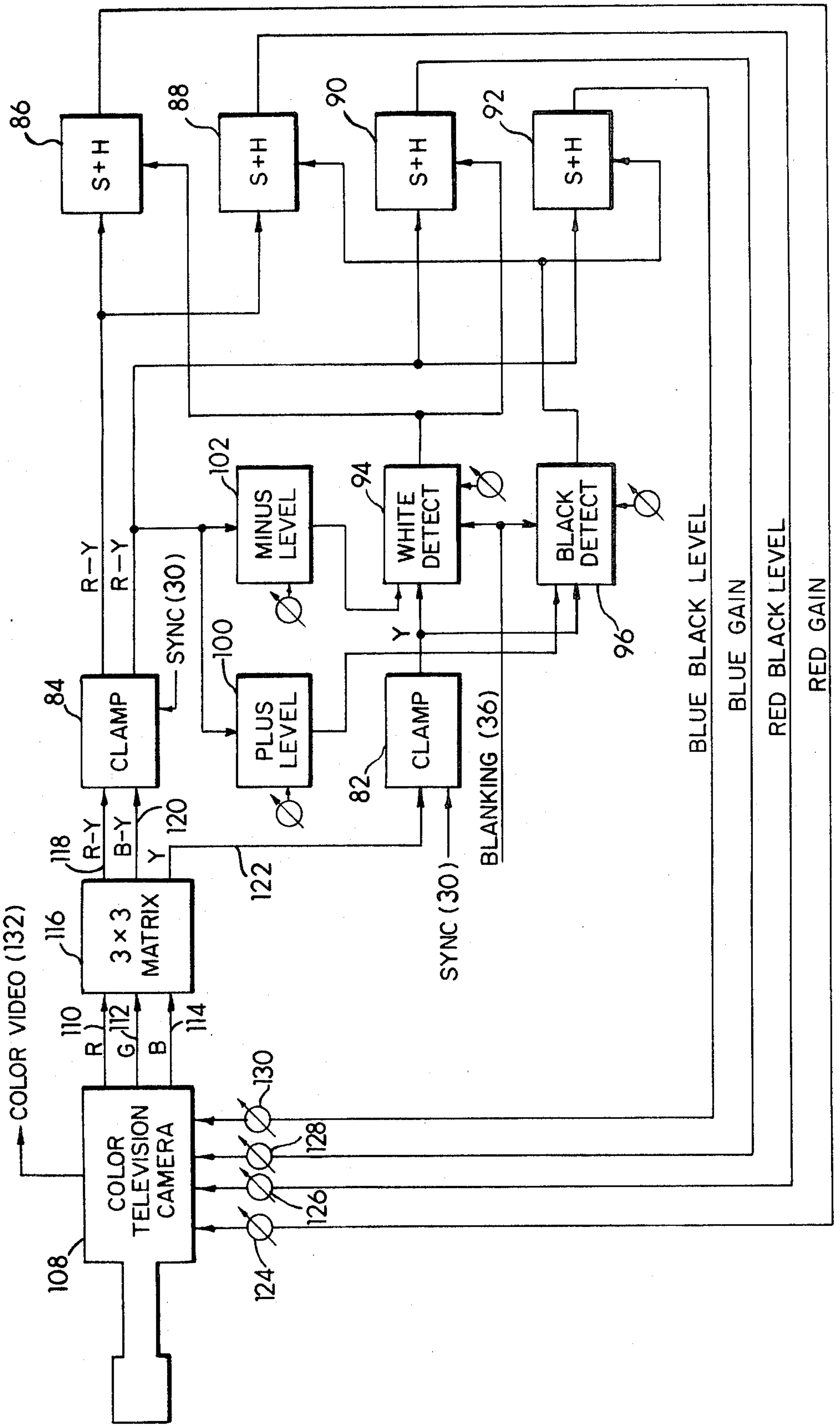
FIG. 3 illustrates an application of the invention to live camera automatic color correction.

As mentioned above, one of the contributions to color variation in producing a color video signal is color error that comes from the camera source, particularly in a live broadcast where there is no opportunity to make corrections before the signal is broadcast. An embodiment of the invention illustrated in FIG. 3 operates to instantly and automatically correct the primary color signals generated by a live color camera or other source. In FIG. 3, a color television camera 108 produces primary color information signals on lines 110, 112 and 114 representing red (R), green (G), and blue (B) color values. These signals are applied to a 3 × 3 transformation matrix 116 where they are converted to color difference signals, R-Y and B-Y, on lines 118 and 120 and a luminance signal, Y, on a line 122. Employing the circuitry of FIG. 2, the clamp circuit 84 receives the color difference signals on lines 118 and 120 while the clamp circuit 82 receives the luminance signal on line 122. The clamped color difference signals, R-Y and B-Y, are applied to the sample and hold circuits 86 and 88, and 90 and 92 respectively. The white and black variable level detection circuits 94 and 96 receive the clamped luminance signal along with respective detection inhibit signals from the minus level and plus level detection circuits 102 and 100 that respond to the B-Y color difference signal. Level detection indicating outputs of the white and black level detection circuits 94 and 96 are applied as enable inputs to the sample and hold circuits 86 and 90, and 88 and 92 respectively. The outputs of sample and hold circuits 86, 88, 90 and 92 are applied in color camera 108 to normal color adjust controls 124, 126, 128 and 130 to provide respective automatic red gain and red black level adjustments and blue gain and blue black level adjustments. The video signal output 132 of the color camera 108 is accordingly continuously adjusted as the live action occurs to produce a corrected camera output signal according to the principles indicated above.

While the above-described system has been presented in the context of video color signals it can be applied to other composite signals where one of the signal components should cross-correlate with the other components to the extent of defining the value of those other components at predetermined values of that one component.

Also, it will occur to those skilled in the art that various modifications and alterations can be made to the disclosed circuitry without departing from the spirit of the invention. It is accordingly intended to limit the scope of the invention only as indicated in the following claims.

What is claimed is:

1. A control system for automatically correcting color balance in a plurality of color signals representing color and brightness content of an image comprising:

means for detecting conditions of brightness extremes in said plurality of color signals;

means for sensing the color content represented by said plurality of color signals;

means for sampling the value of the sensed color content in response to the detection of brightness extremes; and means operative in response to said sampled values of the sensed color content at brightness extremes for adjusting the color content of said plurality of color signals to reduce color content at said brightness extremes, thereby to reduce the color unbalance of said plurality of color signals.

2. The control system for automatically correcting color balance according to claim 1 further including means operative in response to sensed color content for inhibiting sampling by said sampling means under conditions of color content which is significantly indistinguishable from said detected brightness extremes.

3. The control system for automatically correcting color balance according to claim 1 wherein said adjusting means further includes:

means for amplifying one or more of said plurality of color signals with a gain characteristic which is variable in response to color content values sampled coincident with detected maximum brightness extremes; and means for providing an offset signal to one or more of said plurality of color signals with a value representative of the color content values sampled coincident with detected minimum brightness extremes.

4. A system for automatically correcting color balance in a plurality of video signals representing image color and brightness characteristics comprising:

means for developing a signal to represent image brightness from the plurality of video signals;

means for detecting relative maximum conditions in the brightness signal;

means for detecting relative minimum conditions in said brightness signal;

means for sensing the color characteristics in said plurality of video signals and operative to provide color signals representative thereof;

means for sampling said color signals in response to detection of relative maximum and minimum conditions in said brightness signal;

means for adjusting the color characteristics represented by said plurality of video signals in response to said sampled color signals and operative to reduce the color represented by said sampled color signals thereby to improve the color balance of said plurality of video signals.

5. The system for automatically correcting color balance of claim 4 wherein:

said developing and sensing means comprise a transformation matrix operative in response to said plurality of video signals to produce said brightness signal and to produce as said color signals, signals varying with the difference between one or more of said plurality of color signals and said brightness signal; and said adjusting means is operative to reduce the color difference signals.

6. A control system for automatically correcting the color balance in red, blue and green color video signals from a color video signal source, said system comprising:

means for transforming the red, blue and green color representing signals into a brightness signal representative of the overall luminance of said color video signals;

means for transforming said red, blue and green color representing signals into first and second color difference signals which respectively represent the difference between values of two of said red, blue and green color representing signals and said brightness signal;

means operative to restore predetermined, lost signal levels to said brightness signal and said color difference signals;

means for detecting when said brightness signal is relatively near one or more extremes in its range of variation;

means operative in response to detection of the condition of said brightness signal being at one or more extremes for sampling the then existing values of said color difference signals;

means for detecting when said color difference signals indicate a substantially blue color content to said color video signals;

means for detecting when said color difference signals indicate a substantially yellow color content to said color video signals;

means for inhibiting sampling of the values of said color difference signals in response to detection of substantially blue and substantially yellow color content in said color video signals; and means for applying the sampled values of said color difference signals to said color video signal and operative to minimize the indications of color in the sampled values of said color difference signals thereby to reduce color unbalance in said red, blue and green color video signals.

7. A method for correcting color balance in a coded color video signal indicating image color and brightness information comprising the steps of:

decoding said color video signal to provide brightness and color signals representing respective brightness and color characteristics of said color video signal;

detecting conditions of approximate brightness extremes in said brightness signal;

sampling said color signals coincidentally with detection of approximate brightness extremes;

developing a coded error signal responsive to said sampled color signals; and combining said coded error signal with said coded color video signal to reduce color information in said coded color video signal under conditions of detected approximate brightness extremes.

8. A control system for automatically standardizing color information in a coded composite video signal indicating color and brightness values of a color image, said system comprising:

means for sampling said composite video signal;

means for decoding said sampled signal to provide brightness and color value representing signals;

means responsive to the brightness representing signal for detecting when the values of said brightness signal indicate an extreme brightness condition;

means responsive to the color value representing signals and to the detecting means for developing the color value representing signal which occurs coincident with detection of an extreme condition in the brightness signal;

means responsive to the developed color value signal for generating a coded error signal representative of color value in said composite video signal at the brightness signal extremes; and means for combining the error signal with said composite video signal to provide reduction of color value in said composite video signal at brightness extremes.

9. The system of claim 8 wherein said error signal generating means includes means responsive to the developed signal representing color value at a high level brightness extreme for altering the rate of variation in the level of the color value represented by said error signal.

10. The system of claim 8 wherein:

said developing means provides a signal to represent the level of the color value signal upon detection of a low level brightness signal extreme; and said means for generating said error signal includes means responsive to said developed signal representing color value at a low level brightness extreme to provide an offset in said error signal which substantially reduces color value in said composite video signal when said brightness signal indicates a low level extreme condition.

11. A system for correcting color deviation in a composite color video signal representing color and brightness content of an image comprising:

means for sampling said composite color video signal;

means for developing a subcarrier synchronizing signal from said sampled signal;

means for reconstituting a subcarrier signal in response to said synchronizing signal;

means for separately detecting brightness and color information signals in said sampled signal;

means for demodulating the separated color information signals in said sampled signal in response to said reconstituted subcarrier signal to provide demodulated color signals;

means for transforming said demodulated color signals to produce one or more primary color information signals;

means for sensing conditions of image brightness extremes represented by said composite color video signal;

means for registering values indicating the color content of said image as represented by said composite color video signal in response to sensing of brightness extremes;

means for variably amplifying said primary color information signals with a gain controlled in response to values registered in response to sensing of maximum brightness extremes to provide a variable error signal;

means for modulating said variable error signal in the format of said composite color video signal and operative in response to the values registered in response to sensing of minimum brightness extremes to provide in said modulated error signal a constant component;

means for combining said composite color video signal with said modulated error signal to provide a corrected composite color video signal.

12. A method for automatically correcting color balance in a plurality of color signals representing color and brightness content of an image comprising the steps of:

sensing the occurrence of brightness extremes in said plurality of color signals;

sampling the color content represented by said plurality of color signals which occur in coincidence with the sensed occurrence of brightness extremes; and adjusting the color content of said plurality of color signals to reduce the sampled color content represented by said plurality of color signals thereby to reduce color content at said brightness extremes and to restore color balance in said plurality of color signals.

13. The method for automatically correcting color balance of claim 12 further including the steps of:

detecting conditions of substantial yellow color content in said plurality of color signals; and inhibiting color content sampling during maximum brightness extremes in response to detection of the conditions of substantial yellow color content.

14. The method for automatically correcting color balance of claim 12 further including the steps of:

detecting conditions of substantial blue color content in said plurality of color signals; and inhibiting color content sampling during minimum brightness extremes in response to detection of the conditions of substantial blue color content.

15. A method for automatically correcting color balance in a plurality of video signals representing image color and brightness characteristics comprising the steps of:

developing a brightness signal to represent the brightness characteristics of said plurality of video signals;

sensing conditions in said brightness signal indicative of approximate brightness extremes;

developing color signals from said plurality of video signals to represent the color characteristics of said plurality of video signals;

sampling said color signals coincident with sensed conditions in said brightness signal indicative of approximate brightness extremes; and adjusting the color characteristics represented by said video signals in response to said sampled color signals to reduce the color characteristics represented by said sampled color signals thereby correcting color balance in said video signals.

* * * * *